«12» United States Patent
Krizansky et al.

(10) Patent No.: US 9,018,560 B2
(45) Date of Patent: Apr. 28, 2015

(54) REPAIR ALIGNMENT METHOD AND APPARATUS FOR TURBINE COMPONENTS

(75) Inventors: Michael Gary Krizansky, Mason, OH (US); Gary R. Peters, Cincinnati, OH (US); Hai Sam, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 730 days.

(21) Appl. No.: 13/400,195

(22) Filed: Feb. 20, 2012

(65) Prior Publication Data
US 2012/0216402 A1   Aug. 30, 2012

Related U.S. Application Data

(60) Provisional application No. 61/447,604, filed on Feb. 28, 2011.

(51) Int. Cl.
| | |
|---|---|
| *B23K 11/00* | (2006.01) |
| *B23K 9/00* | (2006.01) |
| *B25B 1/20* | (2006.01) |
| *F01D 5/00* | (2006.01) |
| *B23K 11/02* | (2006.01) |
| *B23K 11/14* | (2006.01) |
| *B23K 37/04* | (2006.01) |
| *B23P 6/00* | (2006.01) |

(52) U.S. Cl.
CPC ............ *F01D 5/005* (2013.01); *Y10T 29/49318* (2015.01); *B23K 11/002* (2013.01); *B23K 11/02* (2013.01); *B23K 11/14* (2013.01); *B23K 37/0443* (2013.01); *B23K 2201/001* (2013.01); *B23P 6/005* (2013.01); *F05D 2230/80* (2013.01)

(58) Field of Classification Search
CPC .... B23K 11/14; B23K 37/0443; B23K 11/02; B23K 11/002; B23K 2201/001; B23P 6/005; F01D 5/005

USPC ........ 29/402.01–402.21, 889.1, 889.2, 889.7; 219/78.02, 93, 117.1, 121.63, 121.64, 219/121.83, 121.84, 121.85, 121.86; 228/44.3; 269/43, 152, 251
See application file for complete search history.

(56) References Cited

U.S. PATENT DOCUMENTS

| | | | | |
|---|---|---|---|---|
| 4,128,929 | A | * | 12/1978 | DeMusis ...................... 29/889.1 |
| 4,866,828 | A | * | 9/1989 | Fraser .......................... 29/889.1 |
| 5,035,411 | A | * | 7/1991 | Daines et al. ................. 269/231 |
| 5,148,635 | A | * | 9/1992 | Porter ........................... 451/296 |

(Continued)

OTHER PUBLICATIONS

Search Report and Written Opinion from corresponding Netherlands Application No. 2008368, dated Dec. 11, 2012.

*Primary Examiner* — Brett Spurlock
(74) *Attorney, Agent, or Firm* — General Electric Company; Pamela Kachur

(57) ABSTRACT

A turbine component repair apparatus includes: a first die having male and female halves for clamping a first section of a turbine blade with a platform and a root portion of an airfoil, the first die having a recess shaped to receive the root portion and retain a faying surface thereof in predetermined alignment; and a second die having male and female halves for clamping a repair section which defines a tip portion of the airfoil, the second die having a second recess shaped to receive the tip portion and retain a faying surface of the tip portion in predetermined alignment. The first and second dies have mating front faces configured to align their bottom surfaces in a common plane. A alignment device is removably attached to the second die to temporarily align the repair section in the absence of the male half of the second die.

17 Claims, 7 Drawing Sheets

(56) References Cited

U.S. PATENT DOCUMENTS

| | | | |
|---|---|---|---|
| 5,149,071 A * | 9/1992 | Oliveira | 269/43 |
| 6,129,257 A * | 10/2000 | Xu et al. | 228/44.3 |
| 6,326,585 B1 | 12/2001 | Aleshin | |
| 6,354,482 B1 * | 3/2002 | Diebold et al. | 228/112.1 |
| 6,568,077 B1 | 5/2003 | Hellemann | |
| 6,575,702 B2 | 6/2003 | Jackson | |
| 6,607,114 B2 * | 8/2003 | Reser et al. | 228/49.1 |
| 6,908,288 B2 | 6/2005 | Jackson | |
| 7,278,828 B2 | 10/2007 | Steplewski | |
| 7,328,496 B2 * | 2/2008 | Powers et al. | 29/559 |
| 7,882,639 B2 | 2/2011 | Powers | |
| 8,769,815 B2 * | 7/2014 | Shiraishi et al. | 29/889.1 |
| 2005/0109816 A1 | 5/2005 | Swartzbeck | |
| 2009/0001059 A1 * | 1/2009 | Spallek et al. | 219/121.63 |
| 2009/0114703 A1 * | 5/2009 | Bruggenbrock et al. | 228/150 |
| 2009/0193657 A1 * | 8/2009 | Wilson et al. | 29/889.721 |
| 2009/0313822 A1 * | 12/2009 | Lee et al. | 29/889.1 |
| 2010/0005637 A1 * | 1/2010 | Rose | 29/23.51 |
| 2010/0038410 A1 * | 2/2010 | McHale et al. | 228/194 |
| 2010/0044350 A1 * | 2/2010 | Heiml et al. | 219/121.14 |
| 2011/0005075 A1 | 1/2011 | Trewiler | |

* cited by examiner

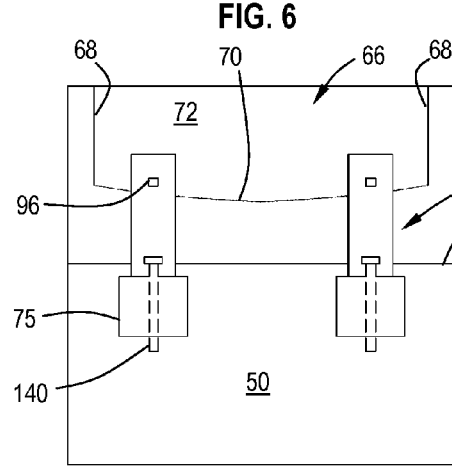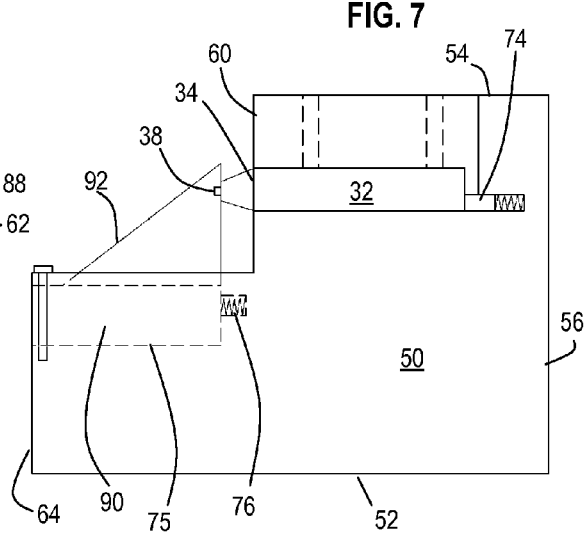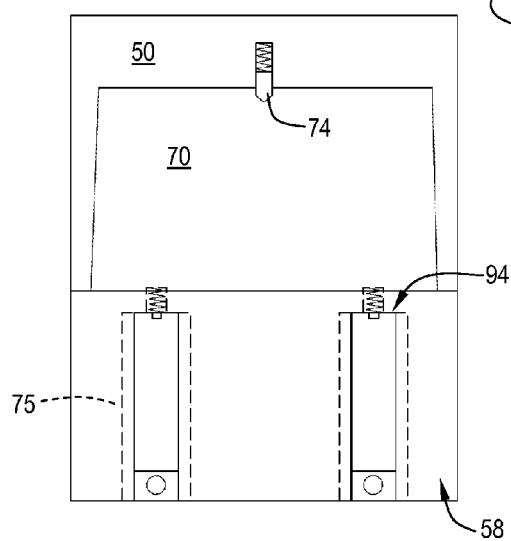

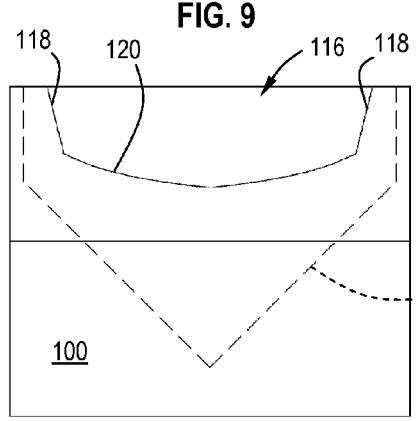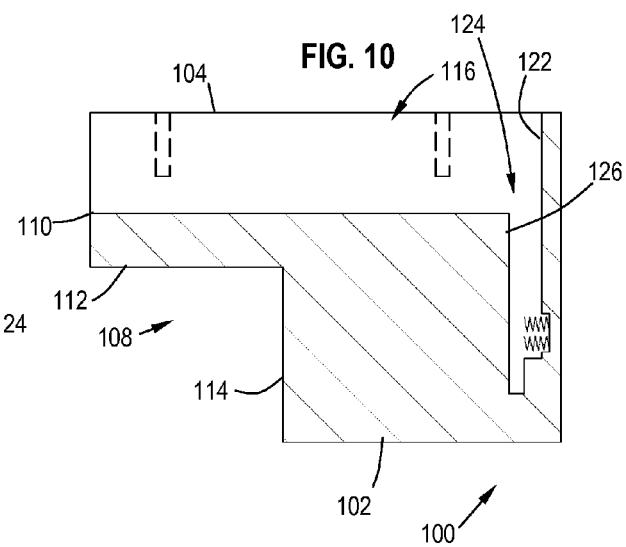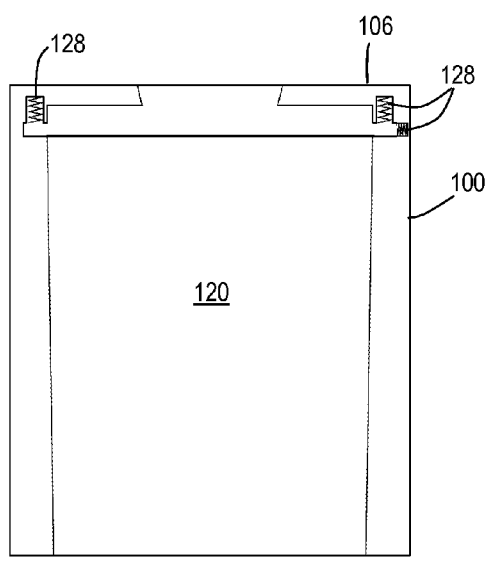

REPAIR ALIGNMENT METHOD AND APPARATUS FOR TURBINE COMPONENTS

CROSS-REFERENCE TO RELATED APPLICATIONS

This application claims the benefit of Provisional Patent Application No. 61/447,604, filed Feb. 28, 2011, currently pending.

BACKGROUND OF THE INVENTION

This invention relates generally to the repair of gas turbine engine components and more particularly to methods of attaching a repair section to a portion of an existing turbine component.

A gas turbine engine includes a compressor that provides pressurized air to a combustor wherein the air is mixed with fuel and ignited for generating hot combustion gases. These gases flow downstream to a turbine section that extracts energy therefrom to power the compressor and provide useful work such as powering an aircraft in flight.

During operation, turbine components, in particular the airfoils in the compressor, are exposed to a high velocity air stream that can lead to oxidation, corrosion, physical damage, and cracking from thermal cycling. Because turbine components are complex in design, are made of relatively expensive materials, and are expensive to manufacture, it is generally desirable to repair them whenever possible.

One known repair method involves providing a repair section (sometimes referred to as a "SPAD". which duplicates a portion of the airfoil. Damaged portions of the field-used airfoils are cut off and then the SPAD is welded or otherwise bonded in place.

Accurate and secure placement of the SPAD during the welding process is necessary to produce a satisfactory end product. The repair requires alignment of the leading and trailing edges as well as circumferential, axial and twist positions. The ability to maintain accurate orientation in a robust welding environment demands a preliminary fixture provide a stable assembly of the components in an equally robust assembly.

Prior art attempts to use this welding technique for 3D airfoil shapes have resulted in poorly aligned leading and trailing edges as well as misalignment in the stacking axis and twist orientation. Further attempts to correct alignment have indicated the lack of current technology to assure alignment.

Accordingly, there is a need for a method of repairing turbine components using a repair section or SPAD while maintaining precise alignment.

BRIEF SUMMARY OF THE INVENTION

This need is addressed by the present invention, which provides a fixture adapted to secure a field-used component and a repair section during an alignment process and also during a subsequent welding procedure.

According to one aspect of the invention, a turbine component repair apparatus includes: a first die having male and female halves configured to cooperatively clamp a first section of a turbine blade which includes an arcuate platform and a root portion of an airfoil extending from the platform, the first die having a first recess shaped to receive a curved surface of the root portion and configured so as to retain a first faying surface of the root portion in a first predetermined alignment relative to a first bottom surface of the first die; a second die having male and female halves configured to cooperatively clamp a repair section which defines a tip portion of the airfoil, the second die having a second recess shaped to receive a curved surface of the tip portion and configured so as to retain a second faying surface of the tip portion in a second predetermined alignment relative to a second bottom surface of the second die; the first and second die having mating front faces configured to align the first and second bottom surfaces in a common plane; and a alignment device removably attached to the front face of the second die and configured to temporarily retain the repair section in the second predetermined alignment in the absence of the male half of the second die.

According to another aspect of the invention, a method for repairing a metallic turbine component includes: providing an engine-run first section of a turbine blade which includes an arcuate platform, a root portion of an airfoil extending from the platform, and a first faying surface at a distal end of the root portion; placing the first section of the turbine blade in a first die having male and female halves cooperatively defining a first recess shaped to receive a curved surface of the root portion; clamping the male half of the first die to the female half so as to retain the first faying surface in a first predetermined alignment relative to a first bottom surface of the first die; providing a repair section which defines a tip portion of the airfoil and includes a second faying surface; placing the repair section in a second die having male and female halves cooperatively defining a second recess shaped to receive a curved surface of the tip portion; attaching an alignment device to a front face of the second die so as to temporarily retain the second faying surface in a second predetermined alignment relative to a second bottom surface of the second die; clamping the male half of the second die to the female half thereof so as to retain the second faying surface in the second predetermined alignment; removing the alignment device; and assembling the first and second dies to each other such that mating front faces thereof engage each other and align the first and second bottom surfaces in a common plane.

BRIEF DESCRIPTION OF THE DRAWINGS

The invention may be best understood by reference to the following description taken in conjunction with the accompanying drawing figures in which:

FIG. 6 is an end view of a repair section die of the fixture of FIG. 5;

FIG. 7 is a side view of the die of FIG. 6;

FIG. 8 is a top view of the die of FIG. 6;

FIG. 9 is an end view of a field item die of the fixture of FIG. 5;

FIG. 10 is a side cross-sectional view of the die of FIG. 9;

FIG. 11 is a top view of the die of FIG. 9; and

DETAILED DESCRIPTION OF THE INVENTION

Figure 1:
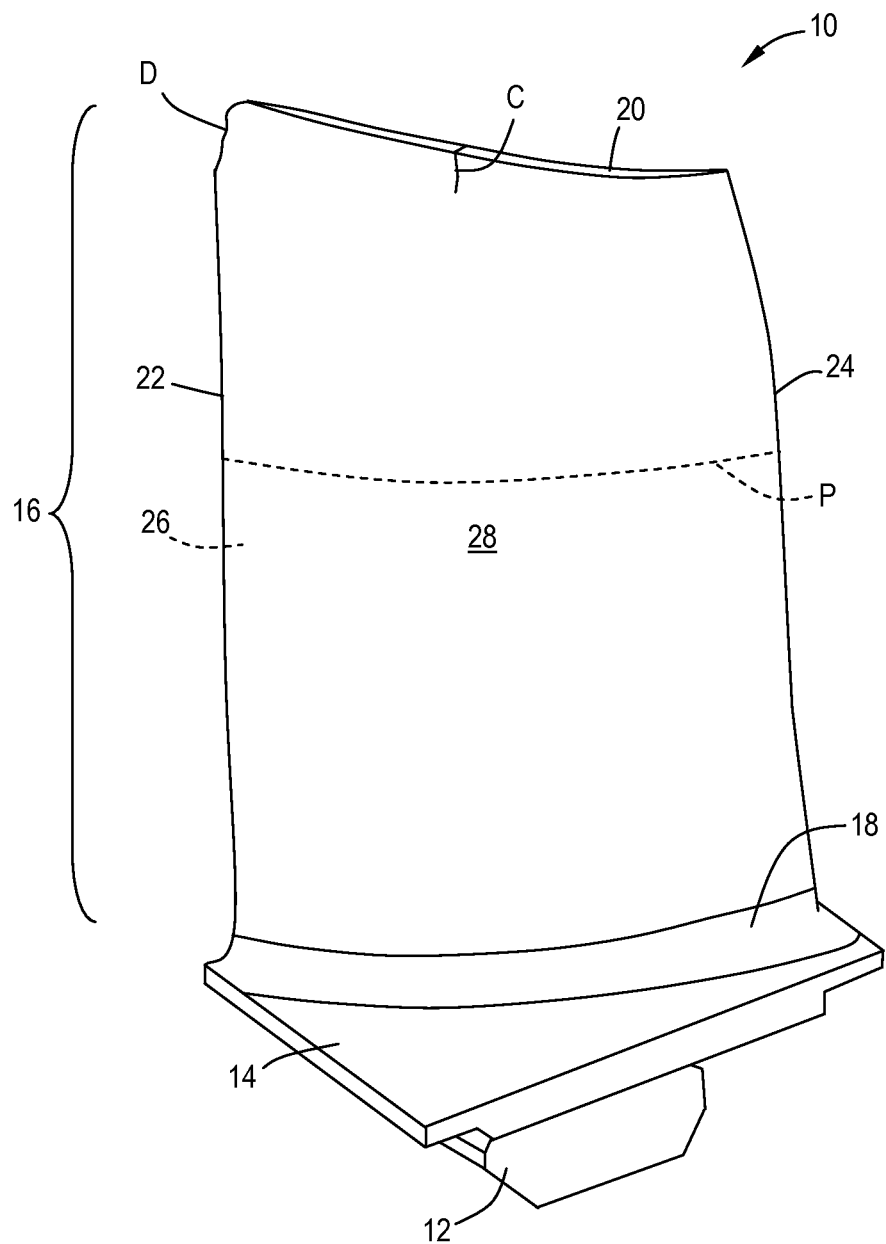
FIG. 1 is a perspective view of an engine-run turbine compressor blade, exhibiting damage from use.

Referring to the drawings wherein identical reference numerals denote the same elements throughout the various views, FIG. 1 shows a compressor blade 10 of a gas turbine engine. It will be understood that the principles of the present invention are also applicable to other kinds of airfoils. The blade 10 includes a dovetail 12 used to mount the blade 10 to a compressor disk wheel (not shown), an arcuate platform 14, and an airfoil 16 having a root 18, a tip 20, a leading edge 22, a trailing edge 24, a concave pressure side 26 and a convex suction side 28.

Typically, such blades are made of an alloy based on at least one of the elements Ti, Fe, Ni, and Co. Nonlimiting examples of such alloys that are commercially available include Ti 6-4, Ti 6-2-4-2, A-286, C 450, IN 718, and RENE 95 alloy.

In operation, the blade 10 is subject to damage, especially tip and erosion damage from abrasive materials and/or foreign object impacts. The blade 10 in FIG. 1 is shown to include both a crack "C" and a damaged area "D" where material is missing.

Figure 2:
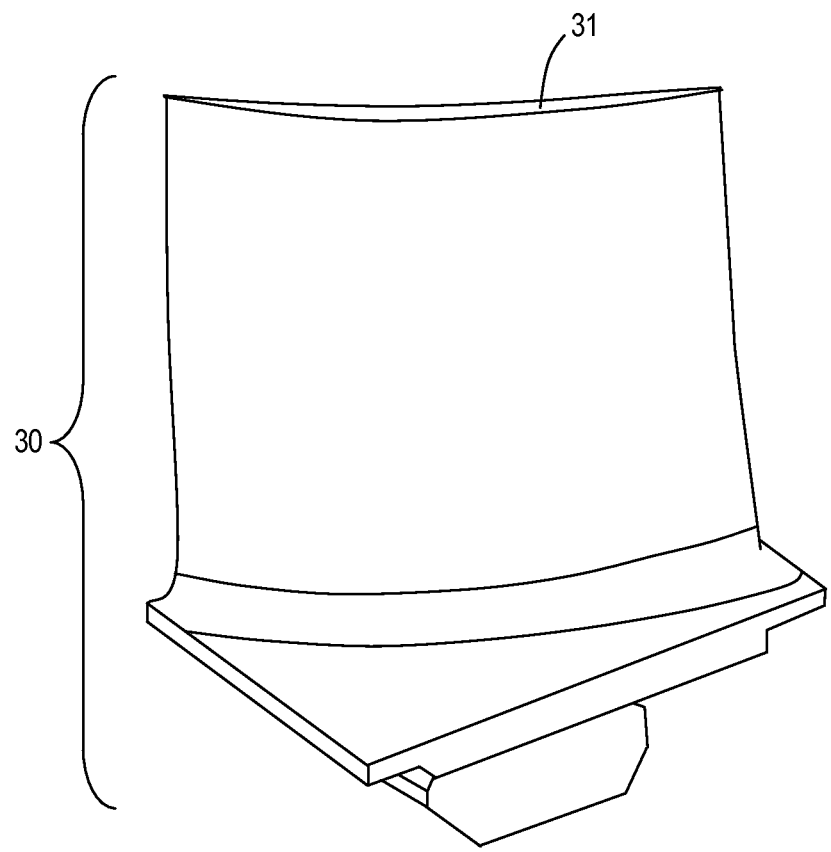
FIG. 2 is a perspective view of the blade of FIG. 1 after being prepared for a welding operation.

FIG. 2 shows the blade after it has 10 been prepared for a subsequent welding process by cutting, grinding, machining, or otherwise working it to remove the spanwise outer portion along a predetermined cutting plane P (seen in FIG. 1). As thus prepared, the remaining portion of the blade 10 is referred to as a "field item" 30. The preparation process exposes a faying surface 31. The cutting plane P is selected so that pressure applied to on the field item 30 along its spanwise or stacking axis during a welding process will not end to cause misalignment. The remainder of the airfoil 16 is referred to herein as a "root portion".

Figure 3:
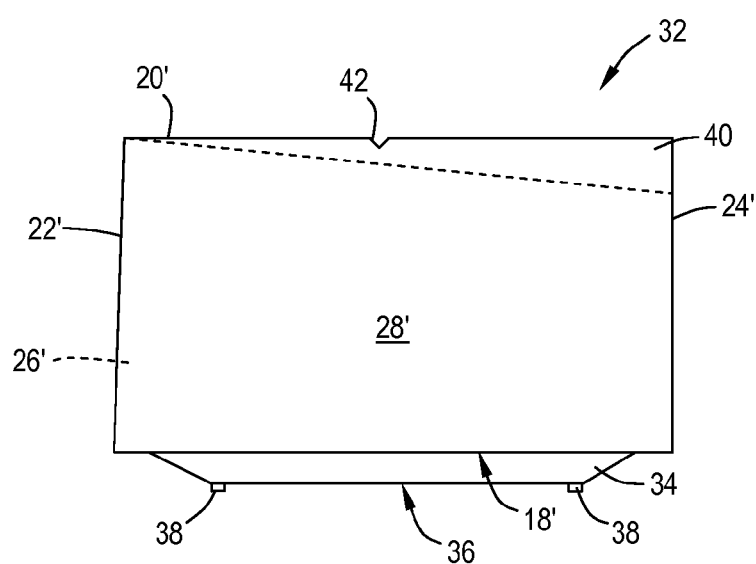
FIG. 3 is a side view of a repair section for use with the blade of FIG. 1.
Figure 4:
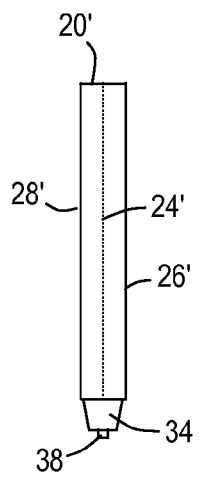
FIG. 4 is a rear elevational view of the repair section of FIG. 3.

FIGS. 3 and 4 illustrate a repair section 32 for use to replace the removed portion of the airfoil 16. This type of repair section may also be referred to as a "SPAD", from the term "spare part assembly detail" or "spare part assembly drawing". The repair section 32 mimics the spanwise outer portion of the airfoil 16 (referred to herein as a "tip portion") and includes a leading edge 22', a trailing edge 24', and opposed pressure and suction sides 26' and 28'. In the radial or spanwise direction, it extends between a tip 20' and a base 18'. An integral sacrificial projection 34 extends from the base 18'. The projection 34 is generally trapezoidal in shape, with its cross-sectional area being tapered down as it extends away from the rest of the base 18'. The projection 34 incorporates a faying surface 36 which is planar or otherwise complementary to the faying surface 31 of the field item 30, as is the base 18'. The dimensions and exact shape of the projection 34 are selected to provide for an appropriate amount of material extrusion for a specific application. A pair of small cross-section tabs 38, for example a few thousands of an inch in length, extend from the base 18' of the repair section 32. The repair section 32 may include a sacrificial portion 40 adjacent the tip 20'. The inner boundary of the sacrificial portion 40 coincides with the finished tip profile, and its outer boundary is parallel to the faying surface 36. A notch 42 is formed in the tip 20'. In the illustrated example the notch is V-shaped.

Figure 5:
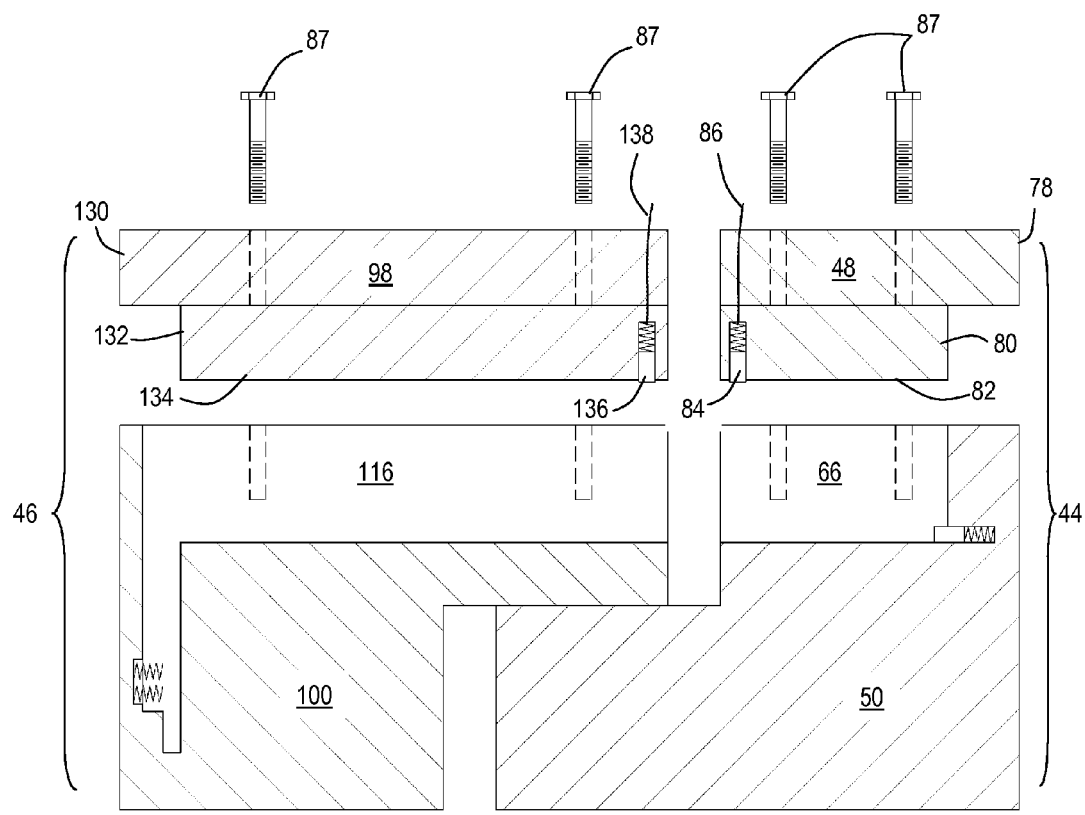
FIG. 5 is a cross-sectional view of a fixture constructed according to an aspect of the present invention.

FIG. 5 shows a fixture used to align and weld the repair section 32 and the field item 30 together. Its basic components are two, two-part dies, referred to as a repair section die 44 and a field item die 46, respectively.

FIGS. 6-8 illustrate the repair section die 44 in more detail. It includes a male half 48 and a female half 50. The female half 50 is generally a rectangular solid. It includes a bottom face 52, top face 54, back face 56, and front face 58. The bottom face 52 is planar and serves to provide a common datum height when assembled to the field item die 46. The front face 58 has a generally Z-shaped profile which includes an upper vertical face 60, a horizontal face 62, and a lower vertical face 64.

A recess 66 is formed adjacent the top face 54, defined by side walls 68, a curved bottom wall 70, and an end wall 72. A spring plunger 74 backed by a compression spring is received in a hole in the end wall 72. The recess 66 is sized and shaped to receive the repair section 32 (shown in FIG. 7) and hold it in the proper alignment.

A pair of spaced-apart locator slots 75 are formed in the horizontal face 62. A compression spring 76 is received in an axially-aligned hole that communicates with the back wall of each locator slot 75.

The male half 48 (seen in FIG. 5) includes a body 78 which mates against the top face 54 of the female half 50, and a block 80 which is shaped to protrude into the recess 66. Its bottom face 82 is curved to match the repair section 32. A spring-loaded electrical contact 84 protrudes from the bottom face 82 of the block 80 and is coupled to an electrical lead 86. Means are provided for securing the male half 48 to the female half 50, such as the illustrated bolts 87.

The repair section die 44 is provided with a pair of locators 88, seen in FIGS. 6-8. Each locator 88 includes a block-like base 90 and a vertically projecting arm 92, and each arm 92 has a planar alignment surface 94 and a notch 96 passing through it, complementary in shape and size to the tabs 38 of the repair section 32. The bases 90 are sized to be received in the locator slots 74 of the repair section die 44.

FIGS. 9-11 illustrate the field item die 46 in more detail. It also includes a male half 98 and a female half 100. The female half 100 is generally a rectangular solid. It includes a bottom face 102, top face 104, back face 106, and front face 108. The bottom face 102 is planar and serves to provide a common datum height when assembled to the repair section die 44. The front face 108 has a generally Z-shaped profile which includes an upper vertical face 110, a horizontal face 112, and a lower vertical face 114.

A recess 116 is formed adjacent the top face 104, defined by side walls 118, a curved bottom wall 120, and an end wall 122. A vertically-oriented platform recess 124 with a vertical wall 126 is disposed adjacent the back face 106 and is contiguous with the recess 116. Compression springs 128 are received in holes in the female half 100, communicating with the platform recess 124, and oriented in both lateral and spanwise directions relative to the field item 30.

The male half 98 (seen in FIG. 5) includes a body 130 which mates against the top face 104 of the female half 100, and a block 132 which is shaped to protrude into the recess 116. Its bottom face 134 is curved to match the field item 30. A spring-loaded electrical contact 136 protrudes from the bottom face 134 of the block 132 and is coupled to an electrical lead 138. Means are provided for securing the male half 98 to the female half 100, such as the illustrated bolts 87.

One or more surfaces of the repair section die 44 and the field item die 46 are electrically insulated as needed so as to avoid current flow between the two dies and between the dies and surrounding hardware or equipment. For example, the exposed die surfaces may be coated with a nonmetallic material.

The fixture comprising the repair section die 44 and the field item die 46 may be used to weld a repair section 32 to a prepared field item 30 as follows.

As a preliminary step, the locators 88 are inserted into the locator slots 74 in the female half 50 of the repair section die 44. They are axially compressed against the compression springs 76 and then held in place with retainers 140 that pass vertically through the bases 90 of the locators 88 and into holes in the female half 50. The retainers 140 may be simple pins, or threaded fasteners may be used. The compression springs 76 serve to take up all axial play between the locators 88 and the female half 50. The installed position is shown in FIG. 7.

Next, the repair section 32 is placed into the recess 66 in the female half 50. The notch 42 in its tip 20' engages the spring plunger 74. It is axially compressed against the spring plunger 74 and manipulated until the tabs 38 fit into the notches 96. It is then released so that the spring plunger 74 urges it axially against the locators 88 until its axial motion stops with the tabs 38 seated in the notches 96. The repair section 32 is thus fully aligned in a specific predetermined orientation in all three axes.

Figure 12:
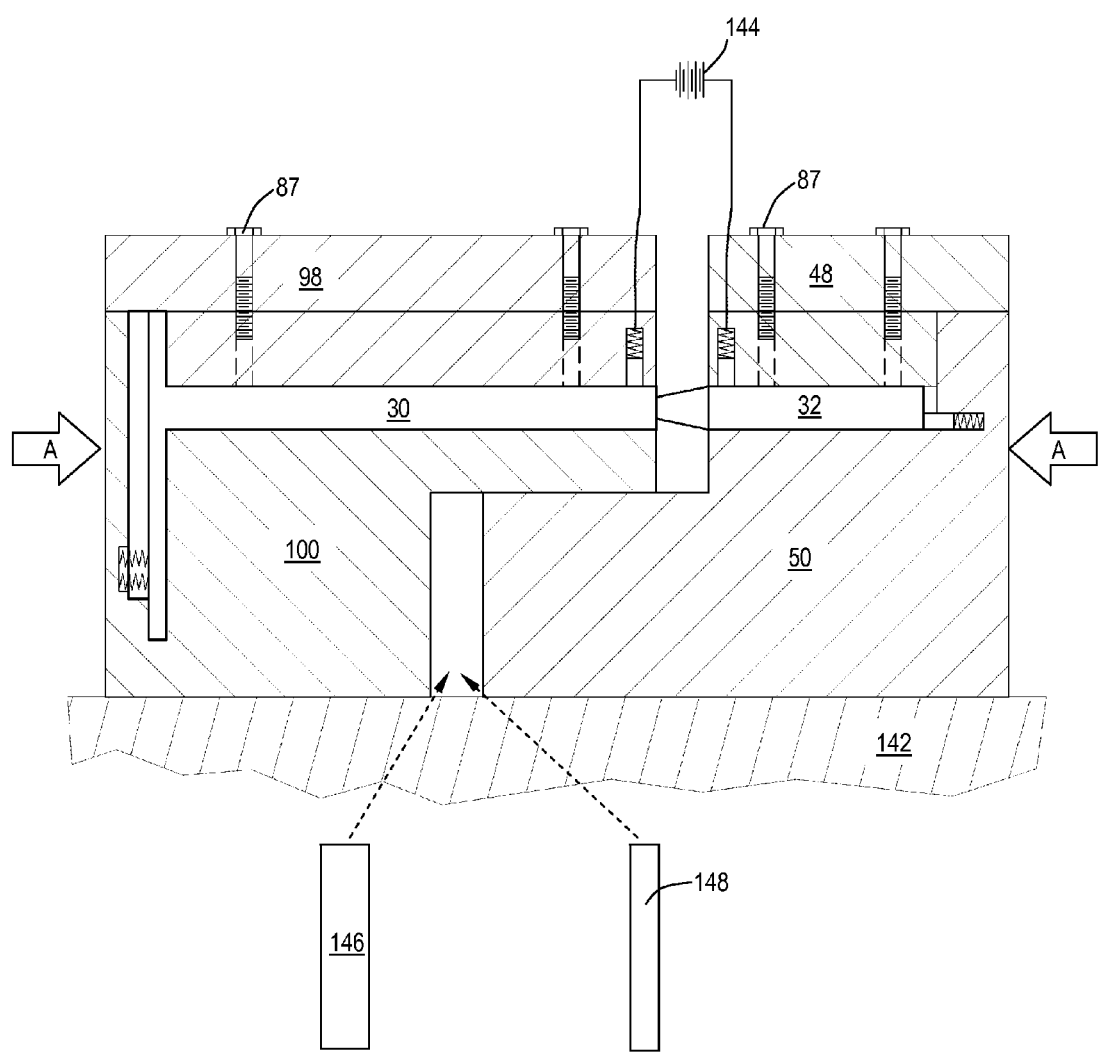
FIG. 12 is a cross-sectional view of the fixture assembled during a welding process.

Referring now to FIG. 12, the male half 48 of the repair section die 44 is next mounted to the female half 50. It may be secured using bolts 87. Alternatively, clamps, or hydraulic or pneumatic clamping means may be used to secure the two halves together. The two die halves securely clamp the repair section 32.

The locators 88 may then be removed, leaving the repair section 32 securely fastened in the desired alignment with the projection 34 extending axially away from the upper vertical face 60.

Next, the field item 30 is placed into the recess 116 in the female half 100 of the field item die 46. The platform 14 is received in the platform recess 124. The compression springs urge the platform 14 against the vertical wall 126 and also preload it in a lateral direction, so that the tip 20' lies flush with the upper vertical face 110. The field item 30 is thus fully aligned in a specific predetermined orientation in all three axes.

Next, the male half 98 of the field item die 46 is mounted to the female half 100. It may be secured using bolts 87. Alternatively, clamps, or hydraulic or pneumatic clamping means may be used to secure the two halves together. The two die halves securely clamp the field item 30. All of the clamping forces are applied through the airfoil, preventing distortion of the platform or dovetail.

The repair section die 44 and the field item die 46 are placed on a datum surface 142 such as a bench, table, or surface plate. They may be held in lateral alignment by fences or rails mounted to the datum surface 142, or by rods or bars passing between the two dies (not shown). The complementary front faces 58 and 108 ensure that the dies 44 and 46 remain in the desired alignment to their respective bottom faces 52 and 102. Means are provided for applying axial compression in the direction shown by the arrows "A". Examples of suitable compression means include, for example, hydraulic or pneumatic cylinders.

Next, an electrical power supply 144 such as a welding power supply (shown schematically in FIG. 12) is connected to the contacts 84 and 136.

If desired, a first spacer 146 may be placed between the front faces 58 and 108 to limit their axial motion. Then, electrical current is supplied to the field item 30 and the repair section 32 through the while an axial force is applied. Electrical resistance heating causes the tabs 38 to melt and fuse to the faying surface 31 of the field item 30, creating two spot welds which temporarily bond the repair section 32 to the field item 30.

Once the spot welds are complete, the alignment of the field item 30 and the repair section 32 can be checked. If the alignment is incorrect, the two components can be cut apart at the spot welds with little to no damage. If the alignment is correct, a final weld can be made.

If desired, a second spacer 148 may be placed between the front faces 58 and 108 to limit their axial motion. Then, electrical current is again supplied to the field item 30 and the repair section 32 through the while an axial force is applied. Electrical resistance heating causes the projection 34 to melt and fuse to the faying surface 31 of the field item 30. As the weld process proceeds, the projection 34 shortens in the axial direction and extrudes laterally outward. When the second weld is complete, the repair section 32 is fully bonded to the field item 30.

After the welds are complete, the bonded field item 30 and repair section 32 are removed from the dies 44 and 46. Excess material around the bond line as well as the sacrificial portion 40 may be cut, ground, and/or machined away to restore the airfoil to new-make dimensions.

The process and apparatus described above has several advantages over prior art repair processes. The ability to utilize the same fixture for pre-alignment and final welding provides increased quality and performance to the product by reducing the amount of individual operations and touch-time. The ability to confirm alignment of the repair section 32 and field item 30 prior to final welding in addition to control of the material flow during compression assures repeatable and quality welds. The fixture design provides repeatable insertion of the components and assures proper placement and orientation to the design intent and complementary components. Application of forces on the airfoil removes pressures and forces from the platform and dovetails. Finally, electrical components are easily serviceable and provide for the shortest path between components thus reducing the localized heating and metallurgy effects.

The foregoing has described a method for repairing turbine components. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A turbine component repair apparatus, comprising:
   a first die having male and female halves configured to cooperatively clamp a first section of a turbine blade which includes an arcuate platform and a root portion of an airfoil extending from the platform, the first die having a first recess shaped to receive a curved surface of the root portion and configured so as to retain a faying surface of the root portion in a first predetermined alignment relative to a first bottom surface of the first die;
   a second die having male and female halves configured to cooperatively clamp a repair section which defines a tip portion of the airfoil, the second die having a second recess shaped to receive a curved surface of the tip portion and configured so as to retain a faying surface of the tip portion in a second predetermined alignment relative to a second bottom surface of the second die;
   the first and second die having mating front faces configured to align the first and second bottom surfaces in a common plane; and
   an alignment device removably attached to the front face of the second die and configured to temporarily retain the repair section in the second predetermined alignment in the absence of the male half of the second die.

2. The apparatus of claim 1 wherein the first and second dies are electrically insulted from each other.

3. The apparatus of claim 1 wherein the front face of the second die has at least one locator slot formed therein, and wherein the alignment device comprises a locator received in each locator slot, each locator including an arm which extends in front of the second recess and presents a planar alignment surface facing the second recess.

4. The apparatus of claim 3 wherein the second die includes a compression spring which bears against each locator so as to remove axial play between the locator and the second die.

5. The apparatus of claim 1 wherein the front face of each die is generally Z-shaped in profile defining an upper vertical face and a lower vertical face interconnected by a horizontal face.

6. The apparatus of claim 1 wherein the second recess includes a spring plunger communicating with the second recess, the spring plunger oriented in an axial direction and configured to engage the repair section.

7. The apparatus of claim 1 wherein the first die includes compression springs communicating with the first recess, the compression spring oriented in both axial and lateral directions and configured to engage the first section of the turbine blade.

8. The apparatus of claim 1 wherein the male half of each die carries an electrical contact which protrudes into the recess of the respective die, each electrical contact being coupled to an electrical lead.

9. A method for repairing a metallic turbine component, comprising:
   providing an engine-run first section of a turbine blade which includes an arcuate platform, a root portion of an airfoil extending from the platform, and a first faying surface at a distal end of the root portion;
   placing the first section of the turbine blade in a first die having male and female halves cooperatively defining a first recess shaped to receive a curved surface of the root portion;
   clamping the male half of the first die to the female half so as to retain the first faying surface in a first predetermined alignment relative to a first bottom surface of the first die;
   providing a repair section which defines a tip portion of the airfoil and includes a second faying surface;
   placing the repair section in a second die having male and female halves cooperatively defining a second recess shaped to receive a curved surface of the tip portion;
   attaching an alignment device to a front face of the second die so as to temporarily retain the second faying surface in a second predetermined alignment relative to a second bottom surface of the second die;
   clamping the male half of the second die to the female half thereof so as to retain the second faying surface in the second predetermined alignment;
   removing the alignment device; and
   assembling the first and second dies to each other such that mating front faces thereof engage each other and align the first and second bottom surfaces in a common plane.

10. The method of claim 9 wherein the front face of the second die has at least one locator slot formed therein, the method further comprising:
   inserting a locator in each locator slot, each locator including an arm which extends in front of the second recess and presents a planar alignment surface facing the second recess, and a notch formed in the alignment surface; and
   engaging tabs extending from the second faying surface of the repair section into the notches.

11. The method of claim 10 wherein the repair section includes a notch formed in a tip thereof opposite the faying surface, the method further comprising engaging a spring plunger carried by the second die with the notch so as to urge the repair section against the alignment surface of the locator.

12. The method of claim 9 further comprising electrically insulating the first and second dies from each other.

13. The method of claim 10 further comprising:
   engaging the first portion and the repair section with electrical contacts carried by the respective dies;
   coupling the electrical contacts to an electric power supply; and
   passing electrical current through the first section and the repair section so as to cause resistance heating at the faying surfaces, while applying axial force to the first and second dies so as to urge the first section and the repair sections towards each other and cause them to fuse together.

14. The method of claim 13 wherein the repair section includes an integral sacrificial projection of reduced cross-sectional area which defines the second faying surface.

15. The method of claim 14 further comprising inserting a first spacer between the dies so as to limit fusion to the axial extent of the tabs of the repair section.

16. The method of claim 15 further comprising:
   removing the first spacer;
   inserting a second spacer smaller than the second spacer between the dies; and
   passing electrical current through the first section and the repair section so as to cause resistance heating at the faying surfaces, while applying axial force to the first and second dies so as to urge the first section and the repair sections towards each other and cause them to fuse together, wherein the projection melts and extrudes outward as the first section and the repair section fuse together.

17. The method of claim 16 wherein the second spacer is selected to result in a predetermined overall length of the fused airfoil sections.

* * * * *

UNITED STATES PATENT AND TRADEMARK OFFICE
CERTIFICATE OF CORRECTION

PATENT NO. : 9,018,560 B2
APPLICATION NO. : 13/400195
DATED : April 28, 2015
INVENTOR(S) : Krizansky et al.

It is certified that error appears in the above-identified patent and that said Letters Patent is hereby corrected as shown below:

On the Title Page, item (74), under "Attorney, Agent, or Firm", in Column 2, Line 2, delete "Pamela Kachur" and insert -- Pamela A. Kachur --, therefor.

In the specification

In Column 3, Line 19, delete "blade after it has 10 been prepared" and insert -- blade 10 after it has been prepared --, therefor.

In Column 4, Line 26, delete "locator slots 74" and insert -- locator slots 75 --, therefor.

In Column 4, Line 62, delete "locator slots 74" and insert -- locator slots 75 --, therefor.

Signed and Sealed this
Twenty-seventh Day of October, 2015

Michelle K. Lee
*Director of the United States Patent and Trademark Office*